United States Patent
Chen et al.

(10) Patent No.: US 12,531,192 B2
(45) Date of Patent: Jan. 20, 2026

(54) KEYBOARD KEY STRUCTURE AND LIGHT GUIDE

(71) Applicant: Logitech Europe S.A., Lausanne (CH)

(72) Inventors: Yung-Lin Chen, Hsinchu (TW); Kuo Hsiang Chen, Toufen (TW); Feng-Hao Lin, Hsinchu (TW)

(73) Assignee: Logitech Europe S.A., Lausanne (CH)

( * ) Notice: Subject to any disclaimer, the term of this patent is extended or adjusted under 35 U.S.C. 154(b) by 110 days.

(21) Appl. No.: 18/462,251

(22) Filed: Sep. 6, 2023

(65) Prior Publication Data

US 2024/0013988 A1 Jan. 11, 2024

(51) Int. Cl.
*H01H 13/02* (2006.01)
*F21V 8/00* (2006.01)

(52) U.S. Cl.
CPC ......... *H01H 13/023* (2013.01); *G02B 6/0038* (2013.01); *G02B 6/0046* (2013.01); *H01H 2219/048* (2013.01)

(58) Field of Classification Search
CPC .... G02B 6/0038; G02B 6/0046; H01H 13/00; H01H 13/02; H01H 13/14; H01H 13/023; H01H 13/12; H01H 13/50; H01H 13/52; H01H 13/70; H01H 13/702; H01H 2219/048; H01H 9/16; H01H 9/18; H01H 9/182; H01H 2003/08; H01H 2003/12; H01H 2009/16; H01H 2009/161; H01H 2009/164; H01H 2013/00; H01H 2013/02; H01H 2013/50; H01H 2013/52; F21V 8/00
USPC ....................................................... 200/310
See application file for complete search history.

(56) References Cited

U.S. PATENT DOCUMENTS 9,971,084 B2 * 5/2018 Cao ..................... G02B 6/0061
2017/0019102 A1 * 1/2017 Chen .................. G02B 19/0085

FOREIGN PATENT DOCUMENTS

| CN | 1116331 A | 2/1996 |
| CN | 204884970 U | 12/2015 |
| CN | 205194593 U | 4/2016 |
| CN | 105742098 A | 7/2016 |

(Continued)

OTHER PUBLICATIONS

Evaluation Report for Utility Model Patent for CN Application No. 202220660347.9; filed Mar. 25, 2022, dated Sep. 23, 2022, 11 pages.

*Primary Examiner* — Anthony R Jimenez
(74) *Attorney, Agent, or Firm* — Kilpatrick Townsend & Stockton LLP

(57) ABSTRACT

In some embodiments, a keyboard key structure includes: a substrate; a key switch, which includes a top housing, a bottom housing. and a key stem. The top housing covers the key stem and is coupled to the bottom housing to form a cavity. The bottom housing is coupled to the substrate. The keyboard key structure further include a keycap including a light transmissive region, the keycap being configured to be coupled to the top housing of the key switch; and a light guide coupled to one side of the cavity of the key switch, the light guide comprising: a flat bottom surface; and a flat top surface wider than and parallel to the bottom surface. The top surface includes uncontinuous, trapezoidal-shaped Fresnel structures at end portions at both ends thereof. A light emitting element is coupled to the substrate and disposed under the bottom surface.

20 Claims, 9 Drawing Sheets

(56) References Cited

FOREIGN PATENT DOCUMENTS

| | | |
|---|---|---|
| CN | 109036927 A | 12/2018 |
| CN | 209880460 U | 12/2019 |
| CN | 210296191 U | 4/2020 |
| CN | 113871238 A | 12/2021 |
| CN | 217386958 U | 9/2022 |

* cited by examiner

KEYBOARD KEY STRUCTURE AND LIGHT GUIDE

CROSS REFERENCE PARAGRAPH FOR PRIORITY

This application claims priority to CN Application No. 202220660347.9, filed on Mar. 25, 2022, and titled "KEYBOARD KEY STRUCTURE AND LIGHT GUIDE THEREFOR," which is hereby incorporated by reference in its entirety for all purposes.

BACKGROUND OF THE INVENTION

The present disclosure relates to a keyboard key structure and a light guide used for the keyboard key structure.

Peripherals typically include auxiliary devices that can be used to interface a person with a computer. Some peripherals include keyboards, computer mice, image scanners, speakers, microphones, web cameras, and more. For example, keyboards have been improved in functionality and performance over the past few decades to improve user productivity, ergonomics, and performance. For example, the development of function keys, keypads, programmable hotkeys, scroll wheels, etc. have helped users become more productive by placing frequently used functions at positions that can be accessed quickly on the keyboard.

In particular, key switches have been improved and modified to suit specific user needs. A key switch is a mechanical device of the entire key structure that registers keystrokes and can vary in response parameters, sound, and travel time. Users can select response parameters, sound and travel time to suit their needs. Some key switch parameters may have increased tactile feedback, linear feedback profiles, faster response times (e.g., shorter activation thresholds), or relatively quiet operation, to name just a few common key switch types.

In some cases, key structures may be illuminated to highlight letters, numbers, characters, or symbols on corresponding keycaps. For example, the backlight may include an array of lights disposed below the key switches of the keyboard, the array of lights generally directing light up and through the light-transmissive portions of the keycaps. Backlighting can be used in gaming applications, for example, to dynamically generate multicolored lighting patterns on a keyboard. However, the area of the key will affect the uniformity of the backlight, and the backlight is usually an overall illumination, which cannot illuminate a single key as required. Thus, although backlighting can improve user experience, it is limited in its useful applications. A better key lighting solution is needed.

It should be noted that unless otherwise indicated herein, the materials described in this section are not prior art to the claims in this application and are not admitted to be prior art by inclusion in this section.

BRIEF SUMMARY OF THE INVENTION

The technical problem to be solved in one aspect of the present invention is to increase the illumination brightness of the keycaps in the keyboard key structure and reduce the waste of illumination resources.

In order to solve the above problems, some aspects of the present invention proposes a keyboard key structure, including: a substrate; a key switch, which includes a top housing, a bottom housing and a key stem, wherein the top housing covers the key stem and is coupled to the bottom housing to form a cavity, wherein the bottom housing is coupled to the substrate; a keycap including a light transmissive region and configured to be coupled to the top housing of the key switch; and a light guide coupled to one side of the cavity of the key switch, the light guide comprising: a flat bottom surface; and a flat top surface, wherein the top surface is wider than the bottom surface and parallel thereto, the top surface includes Fresnel structures at end portions at both ends thereof, the Fresnel structures comprised of a uncontinuous set of ridges; a light emitting element coupled to the substrate and disposed below the bottom surface of the light guide such that the light emitting element, the light guide, and the light transmissive region of the keycap are in a collinear arrangement, wherein the light emitting element is operable to emit light into the bottom surface of the light guide.

According to certain embodiments, the Fresnel structure includes a linear Fresnel structure or a circular Fresnel structure.

According to certain embodiments, the ratio of the sum of the widths of the portions at both ends provided with the Fresnel structure to the total width of the top surface is between 20% and 60%.

According to certain embodiments, the height of the Fresnel structure is between 0.1-0.5 mm.

According to certain embodiments, the height of the light guide between the top surface and the bottom surface is between 2.5-15 mm.

According to certain embodiments, the width of the bottom surface of the light guide is larger than the width of the light emitting element.

According to certain embodiments, the width of the light transmissive region is smaller than or equal to the width of the top surface of the light guide.

According to certain embodiments, the width of the top surface of the light guide is at least twice the width of the bottom surface of the light guide.

According to certain embodiments, the width of the top surface of the light guide is less than twice the width of the bottom surface of the light guide.

According to certain embodiments, when the key switch is in the non-pressed state, the distance between the top surface of the light guide and the light transmissive region of the keycap is D, and the distance D is greater than or equal to 3 mm.

According to certain embodiments, the top surface includes depressions or microstructures in a central portion thereof.

Some embodiments provide a light guide for a keyboard key structure, comprising: a flat bottom surface configured to receive light into the light guide; and a flat top surface, the top surface being wider than the and parallel to the bottom surface, wherein the top surface includes Fresnel structures at both ends thereof, the Fresnel structures comprised of a uncontinuous set of ridges, the light guide guides a portion of light entering the bottom surface of the light guide through the main body of the light guide, and then is projected out from the Fresnel structure on the top surface of the light guide.

According to certain embodiments, the Fresnel structure includes a linear Fresnel structure or a circular Fresnel structure.

According to certain embodiments, the ratio of the sum of the widths of the portions at both ends provided with the Fresnel structure to the total width of the top surface is between 20% and 60%.

According to certain embodiments, the height of the Fresnel structure is between 0.1-0.5 mm.

According to certain embodiments, the height of the light guide between the top surface and the bottom surface is between 2.5-15 mm.

According to certain embodiments, a light guide for a keyboard key structure can include: a planar bottom surface configured to receive light into the light guide; and a flat top surface, the top surface being wider than and parallel to the bottom surface, portions of the top surface at both ends thereof comprising Fresnel structures, wherein the Fresnel structures are comprised of a uncontinuous set of trapezoidal-shaped ridges, wherein the light guide directs a portion of light entering the bottom surface of the light guide through the body of the light guide and out from the Fresnel structures on the top surface of the light guide.

Embodiments of the present invention provide significant improvements over the prior art. For example, a trapezoidal light guide with Fresnel structures at both ends of the top surface can recycle part of the light that deviates from the light transmissive region of the keycap, and increase the brightness of the corresponding part of the light transmissive region on the light-guide end, thus helping to improve the overall average brightness of the light transmission region of the keycap. In addition, the top surface with the Fresnel structure can make the light guide structure more flat, which is beneficial to be placed in a space with more space constraints under the keys of the low-profile keyboard, and provides greater design flexibility for improving the lighting effect of the low-profile keyboard. Those skilled in the art can also find other beneficial effects according to the contents described in the specification.

DETAILED DESCRIPTION OF THE INVENTION

Exemplary applications of methods and devices according to the present application are described in this section. These examples are provided only to add context and to aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, so the following examples should not be considered limiting.

It should be understood that in the embodiments of the present application, "at least one" refers to one or more, and "multiple" refers to two or more. "And/or" describes the association relationship of associated objects, indicating that there may be three types of relationships, for example, A and/or B, which may indicate: A exists alone, A and B exist simultaneously, and B exists alone, where A, B can be singular or plural. The symbol "/" generally indicates that the contextual objects are an "or" relationship. "At least one (item)" or other similar expressions herein refer to any combination of these items, including any combination of a single item or a plurality of items. For example, at least one item of a, b or c can represent a; b; c; a and b; a and c; b and c; or a, b and c, wherein a, b, and c can be single or plural.

In the following detailed description, reference is made to the accompanying drawings, which form a part hereof, and in which are shown by way of illustrations specific embodiments in accordance with the described embodiments. Although these embodiments have been described in sufficient detail to enable those skilled in the art to practice the described embodiments, it is to be understood that these examples are not limiting. It is to be understood that changes without departing from the spirit and scope of the described embodiments is possible.

Figure 1:
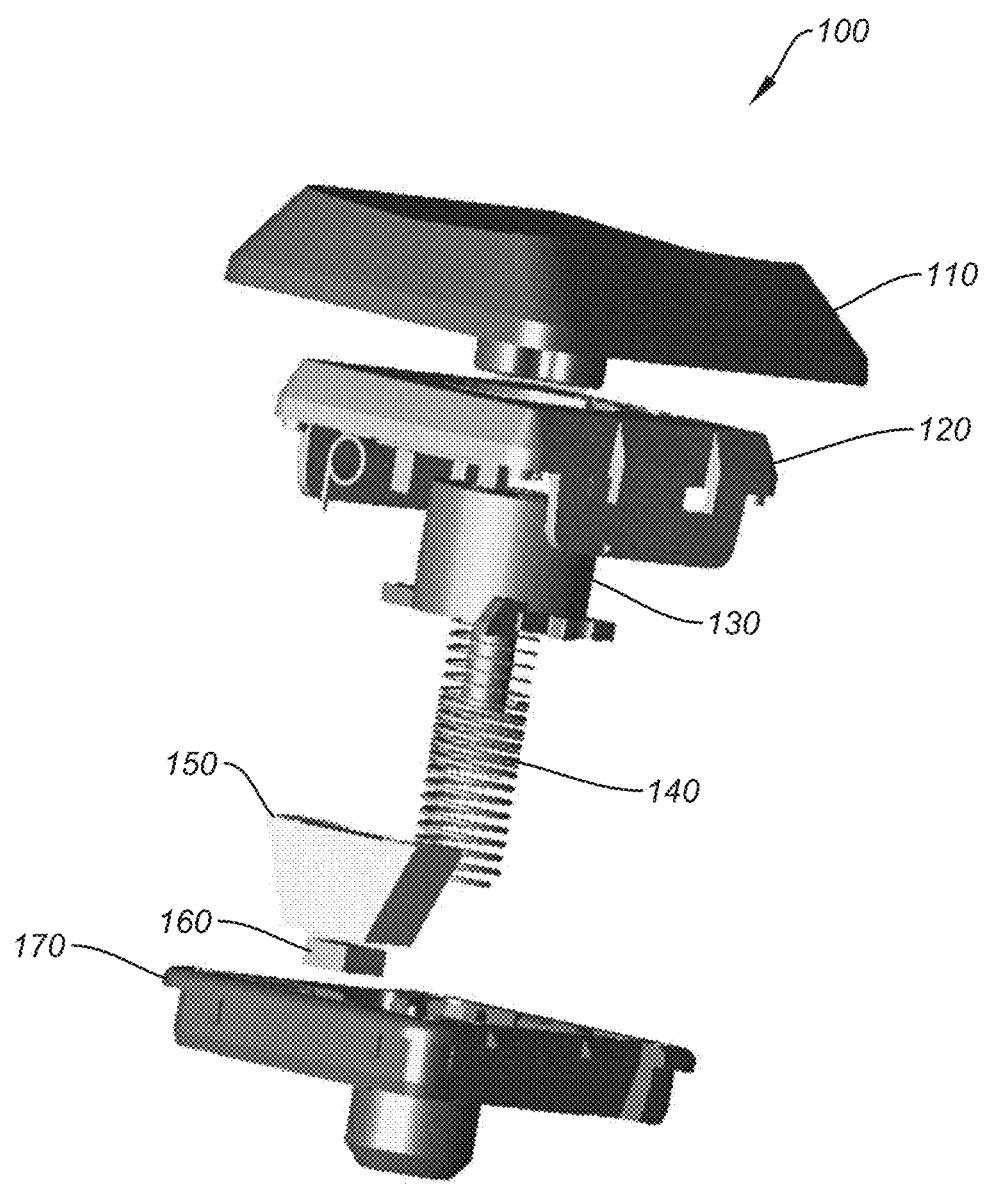
FIG. 1 shows a keyboard key structure according to an embodiment of the present invention.

FIG. 1 shows a keyboard key structure according to an embodiment of the present invention. As shown in FIG. 1, the keyboard key structure 100 includes a keycap 110, a top housing 120, a key stem 130, a spring 140, a light guide 150, a light emitting element 160 and a bottom housing 170, wherein the top housing 120, the key stem 130, the spring 140 and the bottom housing 170 constitute a key switch. It can be understood that the keyboard key structure 100 also includes an unshown substrate. According to one embodiment, the bottom housing 170 is coupled to a base plate. The key stem 130 passes through the spring 140 and is accommodated in the bottom housing 170. The top housing 120 covers the key stem 130 and is coupled to the bottom housing 170 to form a cavity, so that the key stem 130 is accommodated in the cavity formed by the top housing 120 and the bottom housing 170. The keycap 110 is configured to be coupled to and detachably fastened to the top housing 120. The bottom of the keycap 110 is provided with a protrusion. When the keycap 110 is pressed, the protrusion at the bottom of the keycap 110 can push the key stem 130 to move downward against the elastic force of the spring 140, and contact the key circuit on the substrate to complete the key operation. After the force of pressing the keycap 110 disappears, the key stem 130 will return to the rest state under the elastic force of the spring 140.

According to one embodiment, the light guide 150 is coupled into the cavity of the key switch, located on one side of the key stem 130. A light emitting element 160, such as a light emitting diode (LED) light source, is coupled to the substrate and disposed below the light guide 150. The light emitting element 160 can emit light and project it to a certain area on the keycap 110 through the light guide 150. According to one embodiment, the keycap 110 includes a light transmissive region. According to one embodiment, the light emitting element 160, the light guide 150, and the light transmissive region are in a collinear arrangement. According to another embodiment, the entirety of the keycap 110 may also be configured as a light-transmitting structure. According to an embodiment, the light transmissive region of the keycap 110 may be provided with one or more surface features, such as engraved characters or numbers. These numbers or characters can help the user to conveniently determine the functions of the keyboard keys. During use, the light emitted by the light emitting element 160 is projected to the light transmissive region of the keycap 110 through the light guide 150 to illuminate these surface features. This lighting effect not only facilitates the user to quickly locate the key to be operated, but also provides an attractive lighting effect for the keyboard.

Figure 2:
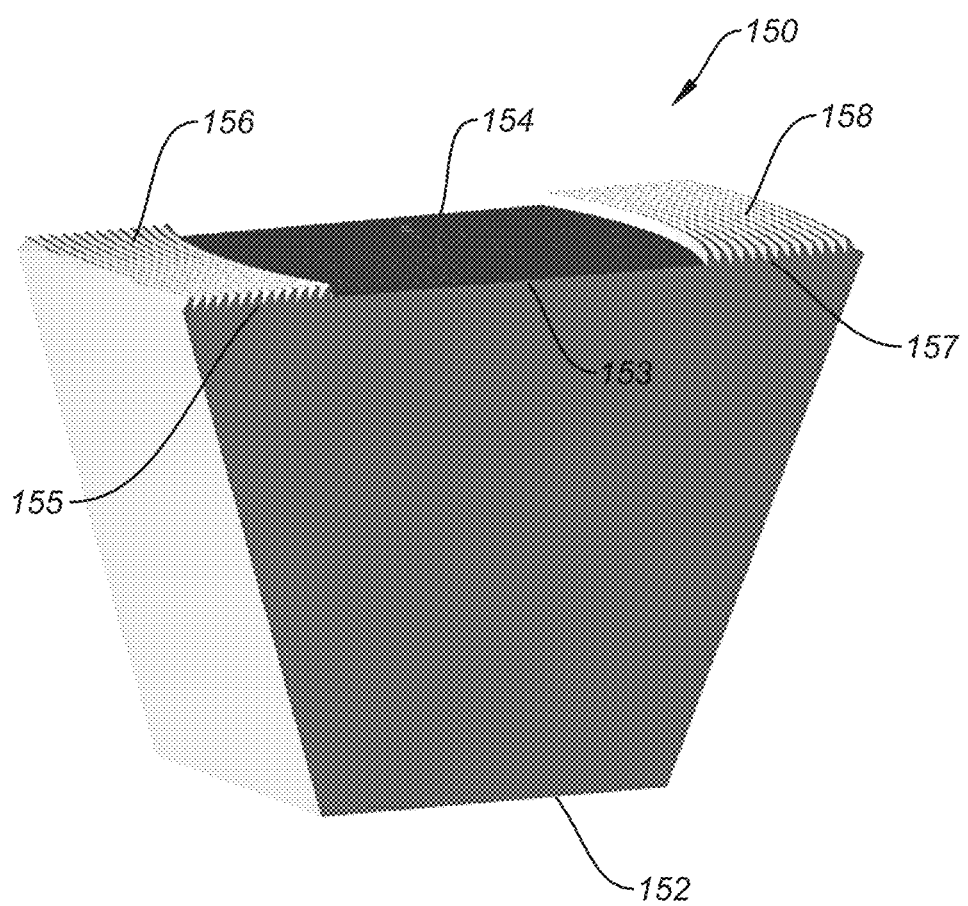
FIG. 2 shows a light guide in a key structure of a keyboard according to an embodiment of the present invention.

According to one embodiment, the light guide 150 is configured as a trapezoid. FIG. 2 shows the light guide 150 in the keyboard key structure 100 according to an embodiment of the present invention. As shown in FIG. 2, the light guide 150 includes a planar bottom surface 152 and a planar top surface 154 that are parallel to each other. According to an embodiment of the present invention, the trapezoidal light guide 150 will be inverted during use. That is, the width of the top surface 154 is greater than the width of the bottom surface 152. According to an embodiment of the present invention, the light guide 150 is configured as an isosceles trapezoid. According to one embodiment of the present invention, the top surface 154 includes end portions 155 and 157 at both ends and a central portion 153 between the end portions 155, 157. As shown in FIG. 2, top surface 154 includes Fresnel structures 156 and 158 on end portions 155 and 157 in accordance with one embodiment of the present invention. According to an embodiment, the Fresnel structures 156 and 158 may be configured as arc-shaped Fresnel structures. According to an embodiment not shown, the Fresnel structures 156 and 158 can also be designed as linear Fresnel structures. According to some embodiments of the present invention, the refractive index of the material used for the light guide 150 may generally be in the range of 1.30 to 1.70. For example, the following materials can be used, where the approximate refractive index is represented by n:

Plastic:
    Acrylonitrile butadiene styrene copolymer (ABS), n=1.534
    Polycarbonate (PC), n=1.496
    Polymethyl methacrylate (PMMA), n=1.493
    Polystyrene (PS), n=1.596
    Polypropylene (PP), n=1.492
Glass, n=1.50~1.65
Silicone rubber, n=1.40~1.60.

Figure 3:
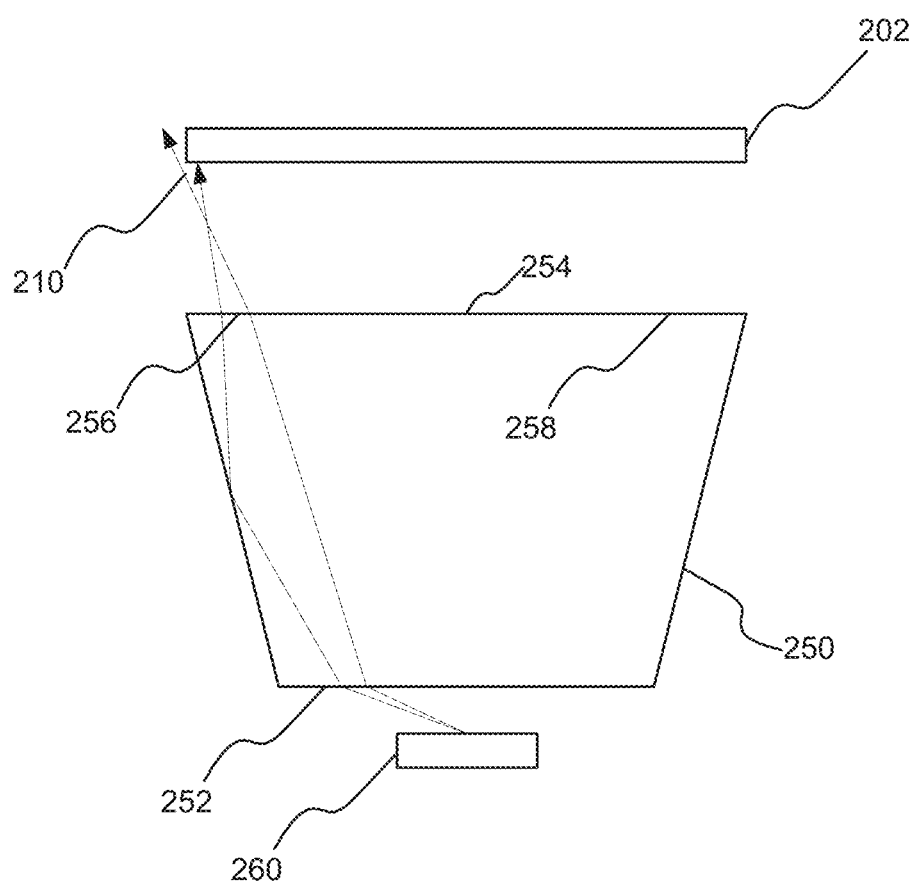
FIG. 3 shows a light path diagram of a keyboard key lighting system including a trapezoidal light guide.

FIG. 3 shows a light path diagram of a keyboard key lighting system including a trapezoidal light guide. Unlike the embodiment of the present invention, the light guide shown in FIG. 3 does not include a Fresnel structure. The lighting system shown in FIG. 3 includes a trapezoidal light guide 250, a light transmissive region 202 of the keycap disposed above the trapezoidal light guide 250, and a light emitting element 260 disposed below the trapezoidal light guide 250. As shown in FIG. 3, the light 210 emitted by the light emitting element 260 enters the trapezoidal light guide from the bottom surface 252 of the trapezoidal light guide 250, and then refracts at the top surface 254 of the trapezoidal light guide 250 to leave the trapezoidal light guide 250. Since the light 210 is transmitted to the end portion 256 of the top surface 254 at a relatively large angle, the light 210 is deflected after refraction and cannot irradiate the light transmissive region 202. If the light guide 250 is used in the key structure of the keyboard, part of the light emitted by the light-emitting element 260 cannot continue to transmit to the keycap facing the light guide 250 to illuminate the light transmissive region 202 on the keycap, thus causing the brightness of the portion of the light transmissive region 202 that correspond to the end portion 256 of the light guide 250 reduced, that is to say, a waste of lighting resources is caused.

Figure 4:
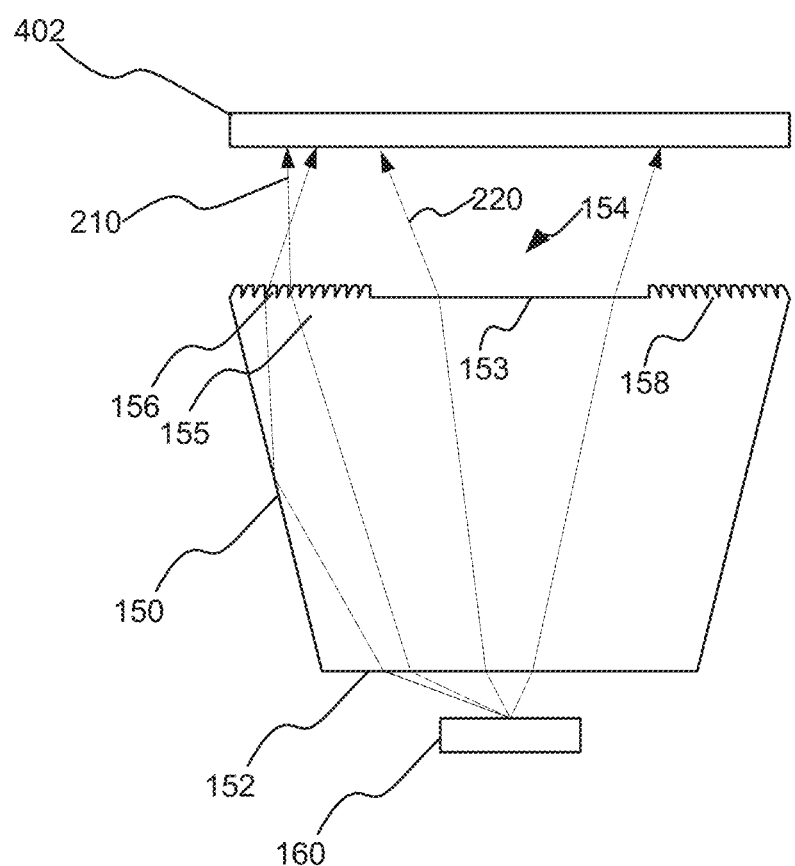
FIG. 4 shows an optical path diagram of a light guide according to an embodiment of the present invention.

FIG. 4 shows an optical path diagram of a light guide according to an embodiment of the present invention. As shown in FIG. 4, the light guide 150 guides a portion of light entering the bottom surface 152 of the light guide 150 through the body of the light guide 150 and exits from Fresnel structures 156 and 158 on the top surface 154 of the light guide 150. Specifically, the light 220 emitted by the light emitting element 160 enters the light guide 150 from the bottom surface 152 of the light guide 150 and exits from the top surface 154. The light 220 emitted from the central portion 153 of the top surface 154 is refracted when leaving the top surface 154, and diverges toward both ends, thereby improving the brightness uniformity of the central portion of the top surface 154. At the same time, the flat central portion 153 allows less light to focus near the center of the top surface 154, alleviating the problem that the central portion is prone to forming hot spots. According to other embodiments of the present invention, the central portion 153 can be configured as a concave part or form a microstructure to further expand the light. The light 210 emitted from the end portions is subject to refraction or even total reflection of the Fresnel structure 156 when leaving the top surface 154, and is deflected toward the central portion 153 of the top surface 154, improving the brightness of the part of the light transmissive region 402 corresponding to the end portion 155, reducing the waste of light.

Figure 5:
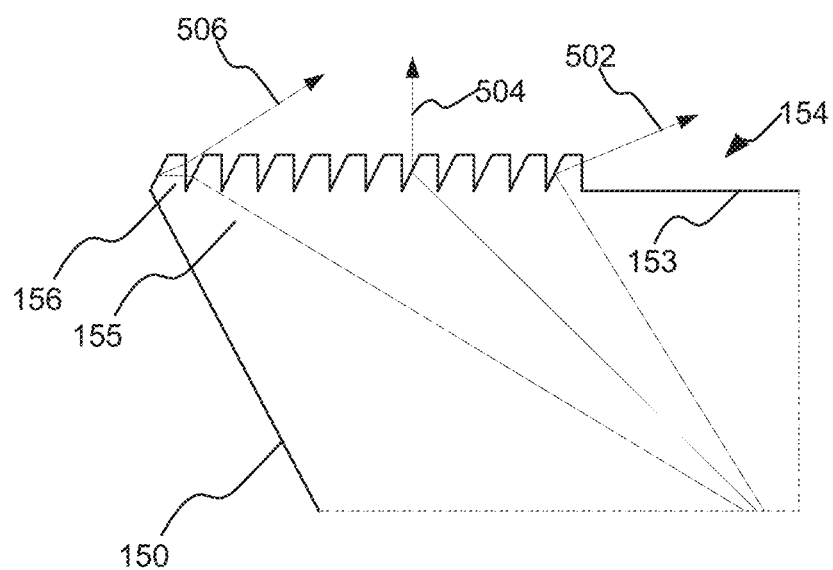
FIG. 5 is an enlarged schematic view of an optical path of an end portion provided with a Fresnel structure according to an embodiment of the present invention.

FIG. 5 is an enlarged schematic view of an optical path of an end portion 155 provided with a Fresnel structure 156 according to an embodiment of the present invention. As shown in FIG. 5, the light emitted by the light emitting element is transmitted through the light guide 150 and exits from the end portion 155. Since the light is refracted or even totally reflected at the Fresnel structure 156 on the end portion 155, the light can be deflected toward the central portion 153 of the top surface 154. Specifically, for example, the light 502 is totally reflected at the Fresnel structure 156, the light 504 is refracted at the Fresnel structure 156, and the light 506 is firstly refracted at the Fresnel structure 156 and then totally reflected. Under the effect of the Fresnel structure 156, the light rays 502, 504 and 506 are no longer deflected toward the edge of the top surface 154, but are deflected toward the center of the top surface 154. Therefore, the Fresnel structure 156 can guide part of the light leaving the top surface 154 at a large deflection angle to be transmitted toward the light transmissive region 402 of the keycap 110 facing the light guide 150, improving the brightness of the part of the light transmissive region 402 corresponding to the end portion 155. Those skilled in the art should understand that the light rays 502, 504 and 506 are merely examples to illustrate the effect of the Fresnel structure 156, and it should not be understood that the present invention is limited to the light rays shown in the FIG. 5. Those skilled in the art should understand that the deflection of the optical path in the Fresnel structure 156 described with reference to FIG. 5 is also applicable to the Fresnel structure 158 on the end portion 157. The Fresnel structure 158 can guide part of the light that leaves the end portion 157 of the top surface 154 at a large deflection angle to be transmitted toward the light transmissive region 402 of the keycap 110 facing the light guide 150, thereby improving the brightness of the part of the light transmissive region 402 corresponding to the end portion 157.

Figure 6:
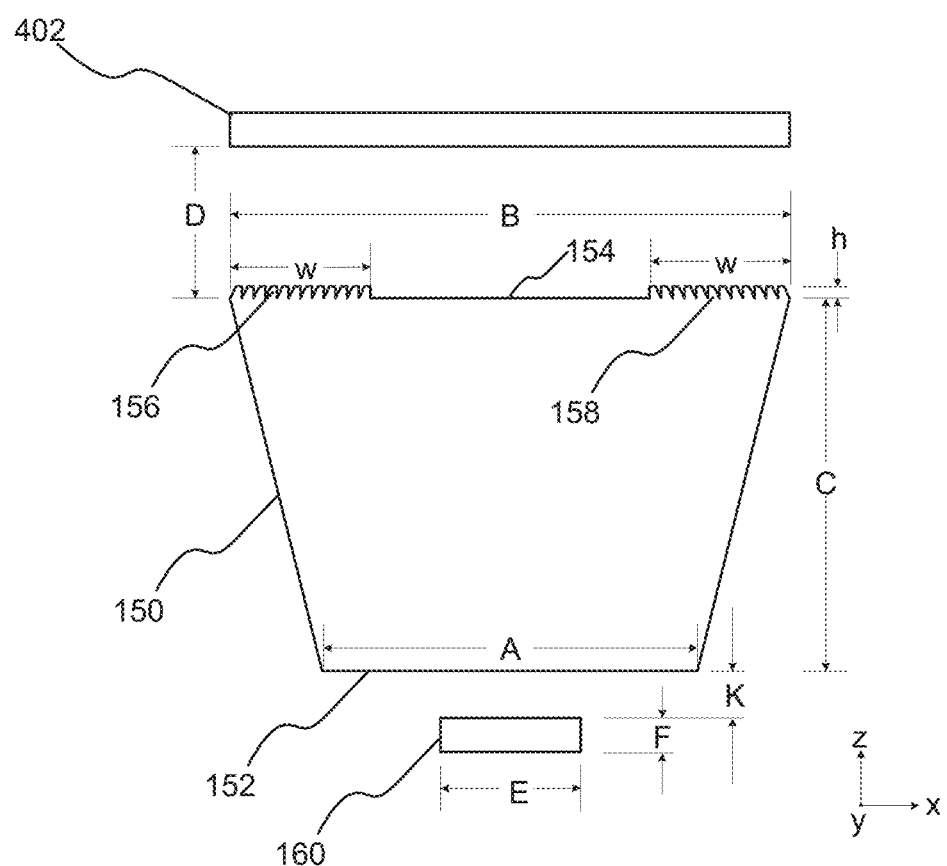
FIG. 6 is a simplified schematic diagram of a light-emitting element, a light guide, and a light transmissive region on a keycap according to an embodiment of the present invention.

FIG. 6 is a simplified schematic diagram of a light-emitting element, a light guide, and a light transmissive region on a keycap according to an embodiment of the present invention. As shown in FIG. 6, the sizes and relative positions of the light guide 150, the light emitting element 160, and the light transmissive region 402 can be appropriately selected according to specific application scenarios, so that a satisfactory uniform illumination effect can be obtained on the light transmissive region 402. According to one embodiment of the present invention, the width A of the bottom surface 152 of the light guide 150 is 3.5 mm, and the width B=2A of the top surface 154 is 7 mm. According to other embodiments of the present invention, the width B of the top surface 154 can be set as B>2A. That is, the width B of the top surface 154 of the light guide 150 is at least twice the width A of the bottom surface 152 of the light guide 150. According to other unillustrated embodiments of the present invention, the width B of the top surface 154 can also be selected as B<2A. According to an embodiment of the present invention, the height h of the Fresnel structures 156 and 158 on the top surface 154 of the light guide 150 can be set to be 0.1 mm≤h≤0.5 mm. According to some embodiments of the present invention, the height of the Fresnel structures 156 and 158 is preferably h≤0.5 mm, which can prevent shadows on the light transmissive regions on the keycap. According to an embodiment of the present invention, the width w of the Fresnel structures 156 and 158 can be selected to 1.35 mm. Those skilled in the art should understand that the width of the Fresnel structures 156 and 158 is not limited to 1.35 mm. According to other embodiments of the present invention, the width w of the Fresnel structures 156 and 158 can be set as a certain proportion of the width B of the top surface 154, such as 20%≤2w/B≤60%. That is, the ratio of the sum of the widths w of the Fresnel structures 156 and 158 provided on the end portions 155 and 157 to the total width B of the top surface 154 is between 20% and 60%.

According to one embodiment of the present invention, the height C of the light guide 150 between the bottom surface 152 and the top surface 154 is 3.9 mm. Since the Fresnel structures 156 and 158 on the top surface 154 can deflect part of the light rays leaving the end portions 155 and 157 towards the center portion of the top surface 154, the light guide 150 can be set to be flatter, and the relatively flat light guide 150 still can achieve relatively uniform illumination on the light transmissive region 402. According to some embodiments of the present invention, the height C of the light guide 150 can be selected to 2.5 mm≤C≤15 mm, so as to adapt to key switches in different application scenarios such as low-profile and high-profile keyboards. The relatively flat light guide 150 facilitates placement in keys with greater space constraints in low-profile keyboards. In addition, the relatively flat light guide 150 can illuminate a larger light transmissive region 402 with relatively uniform brightness while keeping the height of the light guide 150 constant, providing greater design flexibility for designing keyboards with more beautiful lighting effects.

As shown in FIG. 6, according to an embodiment of the present invention, the width of the light transmissive region 402 may be less than or equal to the width B of the top surface 154 of the light guide 150. When the keyboard key structure 100 is in a non-pressed state, the distance D between the top surface 154 of the light guide 150 and the light transmissive region 402 of the keycap 110 is D.

According to an embodiment of the present invention, when applied to a low-profile key switch, D≥3 mm. According to another embodiment of the present invention, when applied to a high-profile key switch, D≥4 mm.

According to an embodiment of the present invention, the width A of the bottom surface 152 of the light guide 150 can be selected to be larger than the width E of the light emitting element 160. For example, the width E of the light emitting element 160 can be selected as 1 mm≤E≤5 mm. According to an embodiment, the height F of the light emitting element 160 can be selected to be 0.1 mm≤F≤2 mm. According to an embodiment of the present invention, the gap K between the light emitting element 160 and the bottom surface 152 of the light guide 150 can be selected to be 0.1 mm≤E≤0.3 mm.

Figure 7A:
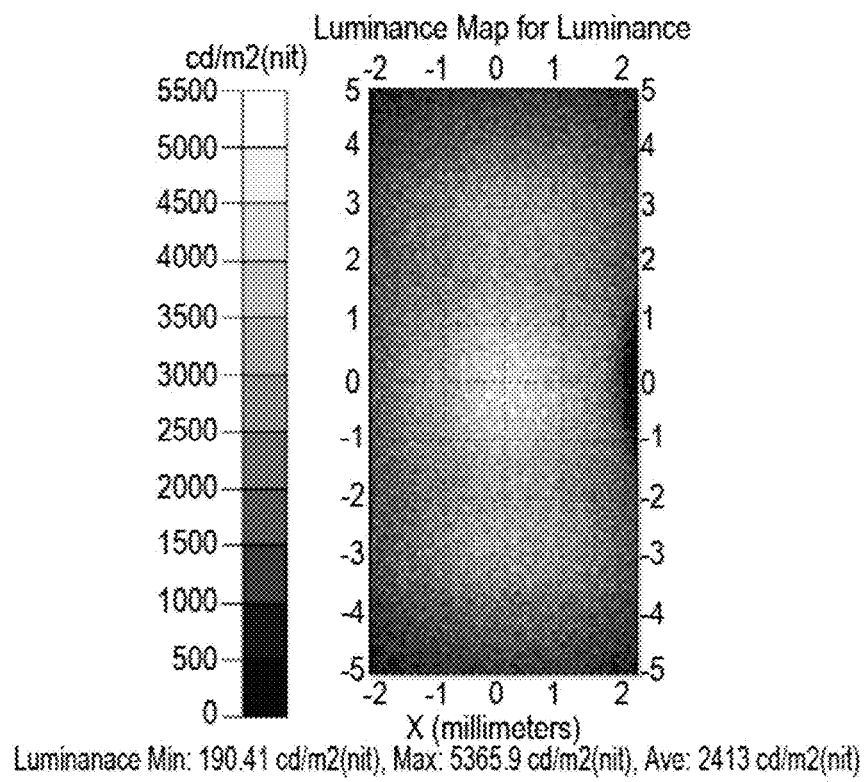
FIG. 7A is a diagram of the brightness distribution generated by the light guide in the light transmissive region according to an embodiment of the present invention.
Figure 7B:
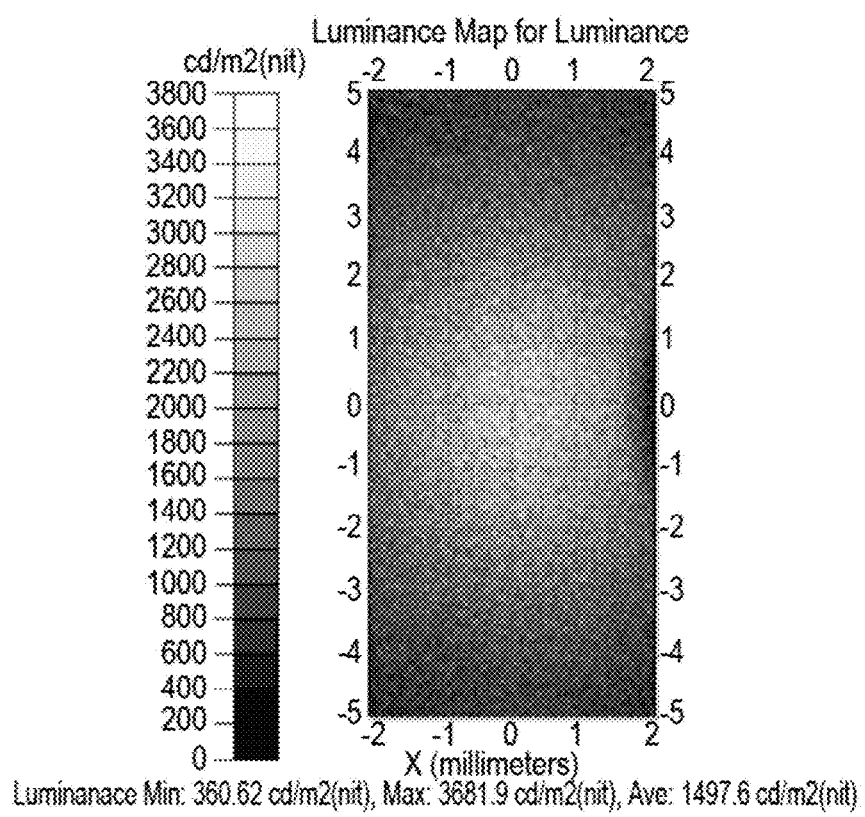
FIG. 7B and FIG. 7C are the brightness distribution diagrams of the two lighting systems for comparison, where the lighting system shown in FIG. 7B also uses a trapezoidal light guide, but the top surface of the light guide is not provided with a Fresnel structure, while a light guide is not used in the illumination system shown in FIG. 7C.
Figure 7C:
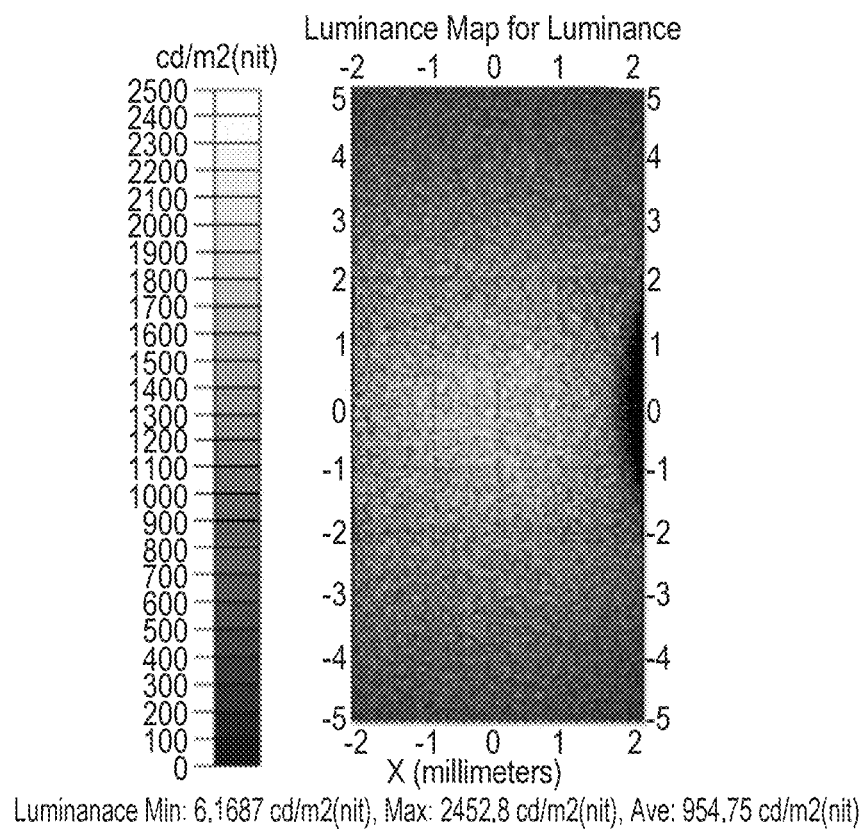

FIG. 7A is a diagram of the brightness distribution generated by the light guide in the light transmissive region according to an embodiment of the present invention. FIG. 7B and FIG. 7C are the brightness distribution diagrams of the two lighting systems for comparison, where the lighting system shown in FIG. 7B also uses a trapezoidal light guide, but the top surface of the light guide is not set Fresnel structure, while the light guide is not used in the illumination system shown in FIG. 7C.

As shown in FIG. 7A, by using the illumination system of the light guide 150 according to an embodiment of the present invention, the average brightness value that can be achieved on the light transmissive region 402 is 2413 nits, and the brightness uniformity is 88.3%. As shown in FIG. 7B, if a trapezoidal light guide without a Fresnel structure is used, the average brightness achieved in the same light transmissive region is 1498 nits, and the brightness uniformity is 85%. It can be seen that the Fresnel structure on the top surface can increase the average luminance value of the light guide by 61%, while the luminance uniformity can be increased by 3.3%. As shown in FIG. 7C, if the trapezoidal light guide is not used, the average brightness achieved on the same light transmissive region is 955 nits, and the brightness uniformity is 86.3%. It can be seen that the average luminance value can be increased by 153% and the luminance uniformity can be increased by 2% by using the trapezoidal light guide with the Fresnel structure on the top surface, compared with the case where the light guide is not used.

Figure 8:
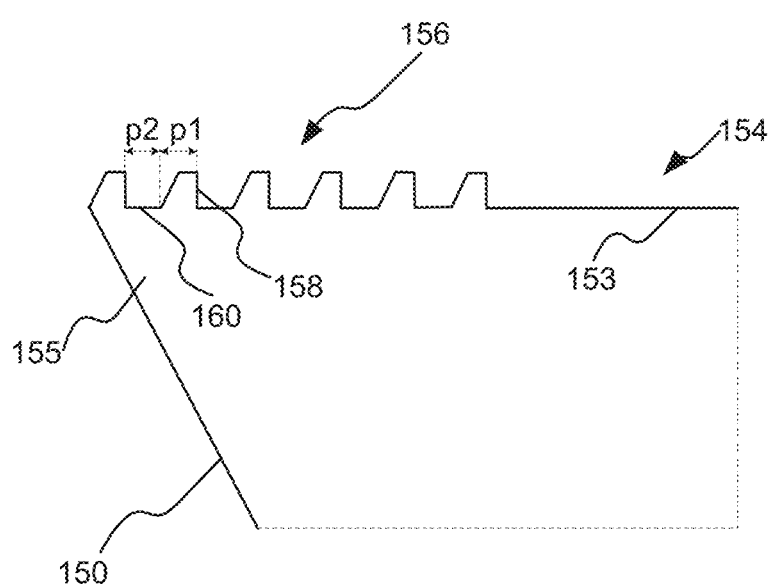
FIG. 8 shows is an enlarged schematic view of an end portion provided with a Fresnel structure according to an embodiment of the present invention.

FIG. 8 shows is an enlarged schematic view of an end portion 155 provided with a Fresnel structure 156 according to an embodiment of the present invention. As shown in FIG. 8, the Fresnel structure 156 includes a plurality of ridges 158 and a plurality of grooves 160 formed between adjacent ridges 158. In one embodiment of the present invention, the width of a ridge 158 may be p1, and the width of a groove 160 may be p2. In some embodiments, the ratio of p1/p2 may range from 1/1 to 1/3. In some embodiments, the groove 160 between adjacent ridges 158 may significantly reduce the manufacturing cost for the light guide 150. It should be noted that similar Fresnel structure 158 may apply to the other end portion 157 (not shown).

Thus, certain embodiments may include a novel and simplified hybrid design, which is composed of a light pipe and an uncontinuous (e.g., periodic, aperiodic) and modified (e.g., flat peaks, no sharp/acute angles/edges) Fresnel structure on a top surface of the light pipe, which includes a number of advantages that can improve the uniformity of the keycap, increase the lighting efficiency of the switch significantly, can make for much easier for manufacturing because Fresnel structure dimension precision can be kept without tooling maintenance, compatible tooling life time, and unit cost, as typical in conventional light pipes, and lighting performance degradation is neglectable during tooling life time, since certain embodiments have no peaks and sharp angles on the novel Fresnel structure. By adding the modified Fresnel structure, the lighting efficiency and uniformity can be improved significantly, so the diffuser added into the keycap can be reduced but still keep compatible uniformity and improved brightness.

As noted above, the modified Fresnel structure can be uncontinuously (e.g., periodic or aperiodic) deployed on the top surface of lightpipe, which can reduce or eliminate sharp angles on the valley of the sawtooth structures, and in some aspects the top of each sawtooth may be flat instead of having a peak. This novel design can substantially reduce manufacturing difficulties, extend the tooling life time by >10× and reduce the cost added to the switch by 50% or more. The design principle of the present novel hybrid design is that the light at a large viewing angle can be redirected and illuminated on the active area (artwork area) of the keycap, which may yield benefits in that (1) light at a large viewing angle is collected so less light is wasted and lighting efficiency is improved; and (2) a brightness on the edge of the keycap active area is increased which can result in better brightness balance across the whole active area and better uniformity. Typically, brightness on the edge of the keycap active area may be dimmer than center of the keycap in conventional designs.

The novel embodiments presented herein can be particularly useful in low profile switches that utilize light pipes. For example, in conventional trapezoidal light pipe designs that do not use a novel Fresnel structure as described herein, efficiency via the light pipe is typically improved up to 1.5×. Embodiments that incorporate an uncontinuuous (e.g., periodic) Fresnel structure on the top surface of the light pipe (e.g., as shown in FIG. 8), and in some cases along the sides of the top surface with a central area of the top surface being flat (see, e.g., FIG. 8), can collect more light at large viewing angles than conventional designs, such that the uniformity of the keycap active area improves and lighting efficiency may improve by 2.5× or more. Thus, certain embodiments may employ any combination of the following structural characteristics of the novel Fresnel structures described herein: uncontinuous configuration (e.g., periodic, aperiodic) with flat grooves between each ridge of the novel Fresnel structure; the peak of each ridge can be flat, the ridges may be linear or may form an arc, and an area in the center of the top portion of the light pipe may be flat, as shown in FIG. 6 (but using the modified Fresnel structure of FIG. 8). In some embodiments, modified Fresnel structures having a combination of uncontinuous ridges with flat tops can be described as trapezoidal Fresnel structures having one set of parallel surfaces (e.g., the top and bottom of each ridge) and another set of non-parallel surfaces (e.g., one side structure can be normal to the top surface of the light pipe and the other may be set at an angle, as shown in FIG. 8). These modifications to the Fresnel structure can yield excellent light performance characteristics as compared to light pipes without Fresnel structures without significant deleterious affects as compared to continuous ridge configurations, yet can benefit from significantly product yields due to reduced manufacturing tolerances that can result due to the small size of the light pipe and the sharp edges of Fresnel structures with continuous configurations, as described above.

The foregoing description, for purposes of explanation, uses specific nomenclature to provide a thorough understanding of the described embodiments. It will be apparent, however, to one skilled in the art that the specific details are not required in order to practice the described embodiments.

Thus, the foregoing descriptions of specific embodiments have been presented for purposes of illustration and description. The foregoing descriptions of particular embodiments are not intended to be exhaustive or to limit the described embodiments to the precise forms disclosed. It will be apparent to those of ordinary skill in the art that many modifications and variations are possible in light of the above teachings.

What is claimed is:

1. A keyboard key structure, comprising:
a substrate;
a key switch comprising a top housing, a bottom housing, and a key stem, the top housing covering the key stem and being coupled to the bottom housing to form a cavity, the bottom housing being coupled to the substrate;
a keycap including a light transmissive region, the keycap being configured to be coupled to the top housing of the key switch; and
a light guide coupled to one side of the cavity of the key switch, the light guide comprising:
a flat bottom surface; and
a flat top surface having a width greater than and parallel to the bottom surface, the top surface including Fresnel structures at end portions at both ends thereof, the Fresnel structures comprised of an uncontinuous set of ridges;
a light emitting element coupled to the substrate and disposed below the bottom surface of the light guide such that the light emitting element, the light guide, and the light transmissive region of the keycap are in a collinear arrangement,
wherein the light emitting element is operable to emit light into the bottom surface of the light guide.

2. The keyboard key structure according to claim 1, wherein the Fresnel structure comprises a linear Fresnel structure or an arc-shaped Fresnel structure.

3. The keyboard key structure according to claim 1, wherein a ratio of a sum of the widths of the end portions of the both ends provided with the Fresnel structure to a total width of the top surface is between 20%-60% between.

4. The keyboard key structure according to claim 1, wherein a height of the Fresnel structure is between 0.1-0.5 mm.

5. The keyboard key structure according to claim 1, wherein the width of the light transmissive region is smaller than or equal to the width of the top surface of the light guide.

6. The keyboard key structure of claim 1, wherein the width of the top surface of the light guide is at least twice the width of the bottom surface of the light guide.

7. The keyboard key structure of claim 1, wherein the width of the top surface of the light guide is less than twice the width of the bottom surface of the light guide.

8. The keyboard key structure according to claim 1, wherein when the key switch is in a non-pressed state, a distance between the top surface of the light guide and the light transmissive region of the keycap is D, and the distance D is greater than or equal to 3 millimeters.

9. The keyboard key structure of claim 1, wherein the top surface comprises a depression or microstructure at a central portion thereof.

10. The keyboard key structure of claim 1, wherein a height of the light guide between the top surface and the bottom surface is between 2.5-15 mm.

11. The keyboard key structure of claim 10, wherein the width of the bottom surface of the light guide is greater than the width of the light emitting element.

12. A light guide for a keyboard key structure, comprising:
- a planar bottom surface configured to receive light into the light guide; and
- a flat top surface, the top surface being wider than and parallel to the bottom surface, portions of the top surface at both ends thereof comprising Fresnel structures, the Fresnel structures comprised of an uncontinuous set of ridges,
- wherein the light guide directs a portion of light entering the bottom surface of the light guide through a body of the light guide and out from the Fresnel structures on the top surface of the light guide.

13. The light guide of claim 12, wherein the Fresnel structure comprises a linear Fresnel structure or an arc-shaped Fresnel structure.

14. The light guide according to claim 12, wherein a ratio of a sum of widths of end portions of the both ends provided with the Fresnel structures to a total width of the top surface is between 20%-60%.

15. The light guide of claim 12, wherein the Fresnel structures comprise a height between 0.1-0.5 mm.

16. The light guide of claim 12, wherein a height of the light guide between the top surface and the bottom surface is between 2.5-15 millimeters.

17. The light guide of claim 12, wherein the top surface comprises depressions or microstructures in a central portion thereof.

18. The light guide of claim 12, wherein a width of the top surface is at least twice the width of the bottom surface of the light guide.

19. The light guide of claim 12, wherein a width of the top surface is less than twice the width of the bottom surface of the light guide.

20. A light guide for a keyboard key structure, comprising:
- a planar bottom surface configured to receive light into the light guide; and
- a flat top surface, the top surface being wider than and parallel to the bottom surface, portions of the top surface at both ends thereof comprising Fresnel structures,
- wherein the Fresnel structures are comprised of an uncontinuous set of trapezoidal-shaped ridges,
- wherein the light guide directs a portion of light entering the bottom surface of the light guide through a body of the light guide and out from the Fresnel structures on the top surface of the light guide.

* * * * *